Figure 1:
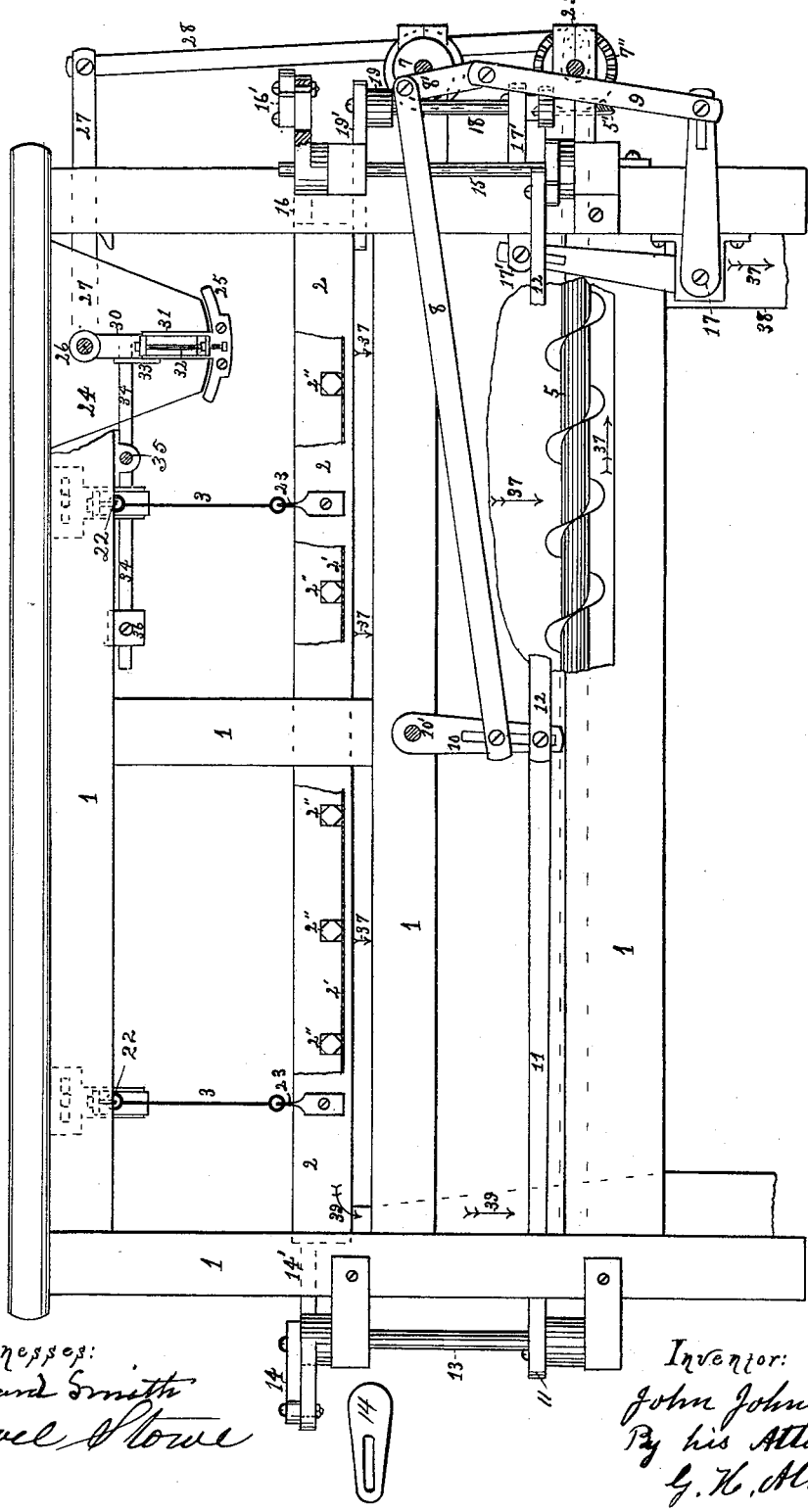

(No Model.)  2 Sheets—Sheet 1.

J. JOHNSTON.
FLOUR BOLT.

No. 403,675.  Patented May 21 1889.

Witnesses:
Edward Smith
Lovel Stowe

Inventor:
John Johnston.
By his Attorney
G. H. Albee.

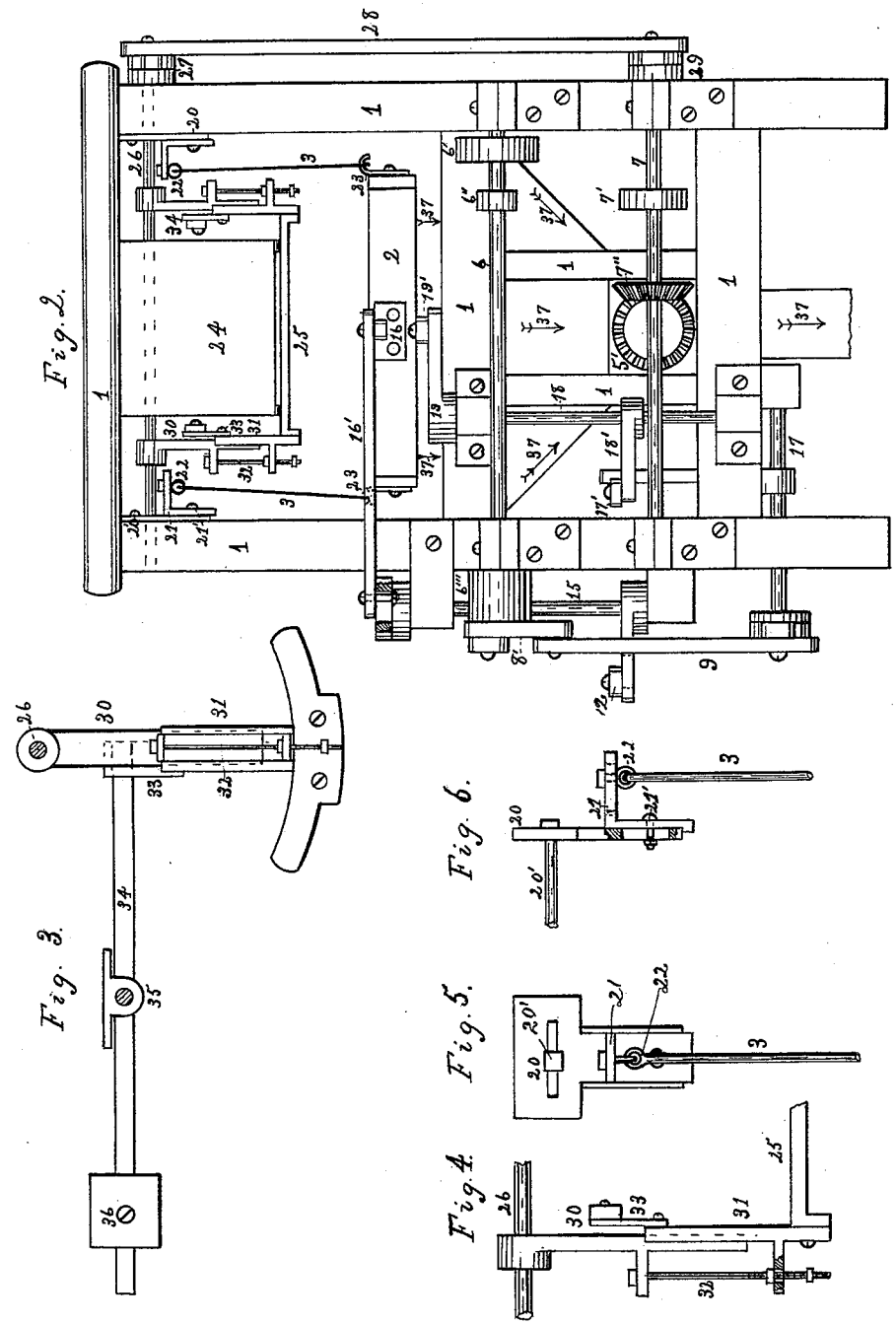

UNITED STATES PATENT OFFICE.

JOHN JOHNSTON, OF NEENAH, WISCONSIN.

FLOUR-BOLT.

SPECIFICATION forming part of Letters Patent No. 403,675, dated May 21, 1889.

Application filed November 17, 1887. Serial No. 255,404. (No model.)

*To all whom it may concern:*

Be it known that I, JOHN JOHNSTON, a citizen of the United States, residing at Neenah, in the county of Winnebago and State of Wisconsin, have invented a new and useful Flour-Bolting Machine, of which the following is a specification.

My invention is in the class of shaking-bolts—that is to say, bolts having a reciprocating horizontal sieve; and it consists in the improvements hereinafter pointed out.

Figure 1 is a longitudinal elevation showing one side of the entire machine. Fig. 2 is an elevation of one end of the machine. Figs. 3 and 4 are views, upon an enlarged scale, of parts of the device governing the feed; and Figs. 5 and 6 are like views of the sieve or bolter suspending device.

Similar figures of reference indicate like parts in the several views.

In Figs. 1 and 2, 1 indicates the frame of the improved flour-bolter, to which the various parts of the improvement are attached.

2 is the frame of the sieve, having nearly the entire surface of its bottom covered with bolting-cloth 2'.

3 3 are the rods upon which the sieve hangs.

24 is the feeding-hopper.

5 is the screw conveyer for removing the bolted product. Upon the front end, Fig. 2, is the principal driving-shaft 6, which is revolved by power applied from any available motor to the pulley 6'. The shaft 7 is rotated by means of a belt running on its pulley 7' and the pulley 6'' of shaft 6. A bevel-gear, 7'', is fixed on said shaft 7 and meshes with another, 5', upon the end of the screw-conveyer shaft 5, by means of which said conveyer is revolved and the bolted product removed from the bottom of the bolting chest or frame in a manner well known. Upon one end of the shaft 6 is a crank, 6''', to which two connecting-rods, 8 and 9, are connected, (the piece 8' being an extension of the connecting-rod 8 and connecting it with connecting-rod 9.) At the other extremity of connecting-rod 8 is a crank, 10, upon shaft 10'. Near the lower extremity of the crank 10 are attached two connecting-rods, 11 and 12, the former, 11, extending to and connecting with a crank upon the lower end of shaft 13. Upon the upper end of said shaft is a crank having a connecting-rod, 14, connecting with the bar 14', which is attached to the end of the sieve 2. The latter, 12, extends to and connects with a crank near the lower end of the shaft 15. Upon the upper end of the shaft 15 is a crank connected with the bar 16 upon the other end of the sieve 2 by the connecting-rod 16'. At the lower end of the connecting-rod 9 is a crank attached to one end of the horizontal shaft 17. Near the middle of said shaft is a crank, from the upper end of which extends a connecting-rod, 17', to the crank 18' upon the perpendicular shaft 18. Upon the upper end of said shaft is a crank, 19, connected by means of the connection-rod 19' with the end of the sieve 2.

The operation of the foregoing shafts, cranks, and connection-rods is as follows: Upon the revolution of the shaft 6 the short crank upon its extremity produces an oscillating motion in the shafts 10 and 17. These in turn impart a like motion to the shafts 13, 15, and 18, which thereby produce, through their connection therewith, a circular or elliptical motion in the sieve 2. This motion can be made greater or less by the lengthening or shortening of the various cranks, as the material being bolted may require. By means of rods 14' and 16' the sieve is oscillated transversely of the bolter-frame 10, while by rods 19' it is oscillated longitudinally of said frame. The compound motion thus produced has been found to produce the best results in sifting. By varying the lengths of the cranks the oscillation may be made greater or less, as described. The most convenient means of practically varying the length of the cranks is to provide them with slots.

The sieve or bolter frame is suspended from the top of the machine-frame by the suspension devices shown, Figs. 5 and 6 being parts thereof on an enlarged scale. These consist of the plate 20, which is bolted to the top of the frame 1 by the bolt 20', which passes through a slot in said plate, whereby its adjustment longitudinally with the frame is provided for. A bracket, 21, is secured to it by a bolt, 21'. In its upper arm is an eyebolt, 22. Both arms of said bracket are slotted for the purpose of the transverse and vertical adjustment of said eyebolt. Connecting with the eyebolt 22 is a rod, 3, having eyes at each extremity thereof, the upper one connecting with the eyebolt 22 and the lower one with the hook 23, which is bolted to the sieve-frame 2. Four or more of these suspension devices sustain the bolt or sieve frame, and by their adjustment the evenness of depth or distribution of the material over the entire surface of the bolting-cloth and the rapidity of its passage over the sieve are controlled.

Above the bolter or sieve is a hopper, 24, into which the material to be bolted is deposited from a conveyer-spout. It is open at its upper and lower ends. Under its lower end is an apron, 25, which is suspended from the shaft 26, the shaft being supported in bearings in the top of the frame in any convenient manner. Upon one end of said shaft is a crank, 27, its arm extending in a nearly horizontal direction and connecting by means of the connecting-rod 28 with a short crank, 29, upon the end of the shaft 7.

From the shaft 26 depend the hangers 30, outside the hopper, having fitted to slide easily upon their lower ends the brackets 31, bolts 32, threaded for a portion of their length, and having nuts thereon, limiting the movement of said brackets in a vertical direction upon the hangers 30. At the upper ends of the brackets 31 are short connections 33, connecting them with the levers 34, said levers being fulcrumed at 35 and having a weight, 36, adjustable thereon for the purpose of counterbalancing the weight of the brackets 31, the apron 25, and the weight of the material passing through the hopper. At the lower extremity of the brackets 31 they are attached to the apron 25.

The operation of the feeding device is as follows: Upon the revolution of the shaft 7 the short crank 29 upon its end, through the connecting-rod 28, produces an oscillating motion of the shaft 26, the hangers 30, and the brackets 31 and apron 25. The width of the apron is of the proper width to cover the opening at the lower end of the hopper while being oscillated under it. The distance of the apron below the hopper is governed by the weight of the material thereon and the position of the weights 36 upon the levers 34. At each oscillation of the apron a small portion of the contents of the hopper escapes through the narrow opening between it and the apron 25, and is deposited upon the bolter or sieve uniformly across nearly the entire width of the sieve. By means of the weight 36 upon the levers controlling the opening between apron and hopper the escape of the material therefrom is governed and the liability of the conveyer-pipes being clogged by too rapid discharge of the material upon the sieve is prevented and a uniform feed to the sifting apparatus is assured. The rectangular bolt or sieve 2 has nearly the entire surface of its bottom covered with bolting-cloth 2', of a quality demanded by the quality of the material being operated upon. The bolting-cloth may be tacked to the inside of the sieve-frame 2, or there may be several sections of sieves detached therefrom of such length as may be found desirable, and they may be temporarily secured therein in any convenient manner. When the product of the mill is uneven in quality, this will be found advisable, as permitting an easy and quick substitution of other sieves of the required mesh.

Upon the surface of the bolting-cloth 2' are numerous blocks of wood 2'' of polygonal form. These blocks are kept in agitation on the cloth by the reciprocating motion given it, and by this means prevent any clogging of the meshes therein by the fine floury particles in the product being operated upon. The finer particles of the material are by the action of the sieve made to pass through the meshes thereof, and, following the direction of the arrows 37, are carried out by the screw conveyer and discharged through the spout 38, from whence they may be conveyed to the desired place. The bran and coarser particles are carried over the further extremity of the sieve and dropped through the passage 39 in the direction of the arrows therein, from whence they may be conveyed by a screw conveyer to the desired location.

In a companion application bearing the Serial No. 244,831 I have shown and described a shaking-bolt which resembles this in most of its general features. Thus the sieve is suspended by rods having universal joints, and is adapted for adjustment transversely and longitudinally of the frame of the machine. The sieve is likewise moved or actuated by gearing, cranks, and connecting-rods, and the apron or plate below the hopper is also vibrated and adapted for automatic vertical adjustment, as in this machine; but in such companion application the claims are restricted to features and to particular constructions and combinations of parts, either not shown or not described in this machine.

What I claim is—

1. The combination, in a flour-bolt, with the feeder, of depending swinging arms at opposite sides thereof, a plate at the lower end of said arms, and vertically-movable connections between the plate and arms and means for oscillating said plate, substantially as set forth.

2. The combination, in a flour-bolt, of the hopper 24, having an open bottom, the apron 25, the shaft 26, the hangers 30, the brackets 31, the bolts and nuts 32, the connections 33, the levers 34, having fulcra 35 and weights 36, and mechanism for imparting to the apron an oscillating motion, substantially as shown and described.

3. In a flour-bolt, the combination, with the sieve, its suspending-rod, and the machine-frame, of the plate 20, having horizontal and vertical slots, the angular bracket 21, having a slot in both arms, and bolts 20' 21' and eyebolt 22, passing through the respective slots, as shown and described, whereby lateral as well as longitudinal and vertical adjustment of the sieve is provided for, as specified.

JOHN JOHNSTON.

Witnesses:
EDWARD SMITH,
LOVEL STOWE.